United States Patent
Brenne et al.

(10) Patent No.: US 10,936,803 B2
(45) Date of Patent: Mar. 2, 2021

(54) AGGREGATION AND PROCESSING OF HIERARCHICAL DATA FOR DISPLAY OF INTERACTIVE USER INTERFACE CHART ELEMENTS

(71) Applicant: Microsoft Technology Licensing, LLC, Redmond, WA (US)

(72) Inventors: Leif Christian Brenne, Snoqualmie, WA (US); Brenton Aihe Milne, Bellevue, WA (US); Eleanor Lillian Lewis, Phoenix, AZ (US); Amanda Guanhua Jiang, Diamond Bar, CA (US); Maitreyi Ashok, Simi Valley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 216 days.

(21) Appl. No.: 15/943,446

(22) Filed: Apr. 2, 2018

(65) Prior Publication Data
US 2019/0303433 A1  Oct. 3, 2019

(51) Int. Cl.
*G06F 40/18* (2020.01)
*G06F 40/106* (2020.01)
(Continued)

(52) U.S. Cl.
CPC .............. *G06F 40/18* (2020.01); *G06F 16/26* (2019.01); *G06F 16/287* (2019.01); *G06F 40/106* (2020.01); *G06T 11/206* (2013.01)

(58) Field of Classification Search
CPC .... G06F 16/9024; G06F 16/287; G06F 16/26; G06F 40/18; G06F 40/106; G06T 11/206; G06T 2210/36
See application file for complete search history.

(56) References Cited

U.S. PATENT DOCUMENTS 7,949,964 B2   5/2011   Vimme
9,262,488 B2   2/2016   Sun et al.
(Continued)

FOREIGN PATENT DOCUMENTS

CN   104899288 A   9/2015

OTHER PUBLICATIONS

"NVivo 11 for Windows help—About hierarchy charts", Retrieved From: <<https://web.archive.org/web/20160628202656/http:/help-nv11.qsrinternational.com/desktop/concepts/about_hierarchy_charts.htm>>, Jun. 28, 2016, 7 Pages.
(Continued)

*Primary Examiner* — Ariel Mercado

(57) ABSTRACT

In non-limiting examples of the present disclosure, systems, methods and devices for generating and displaying interactive charts from hierarchical datasets are presented. A dataset comprising a plurality of data points may be received, wherein each of the data points has a score and a weight associated with it, and wherein each of the plurality of data points is a member of a hierarchical category type of the dataset. A weight value that each hierarchical category type contributes to the dataset, relative to each other category type, may be calculated. A score for each of the hierarchical category types may be calculated. A plurality of objects that each represent one of the hierarchical category types may be displayed in a hierarchical format in association with an indication of the calculated score for each of the objects.

18 Claims, 10 Drawing Sheets

(51) Int. Cl.
*G06T 11/20* (2006.01)
*G06F 16/26* (2019.01)
*G06F 16/28* (2019.01)

(56) References Cited

U.S. PATENT DOCUMENTS

| | | | | |
|---|---|---|---|---|
| 9,449,293 | B2* | 9/2016 | Mahmood | G06Q 10/063 |
| 9,773,288 | B2* | 9/2017 | Ananthanpillai | G06F 40/205 |
| 10,331,720 | B2* | 6/2019 | Neels | G06F 3/04842 |
| 2003/0018652 | A1* | 1/2003 | Heckerman | G06F 16/358 |
| 2010/0057581 | A1* | 3/2010 | Narayanaswami | G06Q 30/02 |
| | | | | 705/26.1 |
| 2011/0219324 | A1 | 9/2011 | Watanabe et al. | |
| 2012/0290565 | A1* | 11/2012 | Wana | G06F 16/958 |
| | | | | 707/723 |
| 2013/0317941 | A1* | 11/2013 | Stoll | G06Q 30/0609 |
| | | | | 705/26.35 |
| 2014/0229879 | A1 | 8/2014 | Lee et al. | |
| 2014/0365389 | A1* | 12/2014 | Cheek | G06Q 10/105 |
| | | | | 705/320 |
| 2015/0040052 | A1 | 2/2015 | Noel et al. | |
| 2015/0287227 | A1 | 10/2015 | Reeves | |
| 2016/0275144 | A1 | 9/2016 | Herman et al. | |
| 2017/0046860 | A1 | 2/2017 | Barosi et al. | |

OTHER PUBLICATIONS

"Radial form of Organization Chart", Retrieved From: <<http://www.visualcomplexity.com/vc/project_cfm?id=10>>, 1924, 1 Page.

Hart, et al., "Drill down in a visualization in Power BI", Retrieved From: <<https://docs.microsoft.com/en-us/power-bi/power-bi-visualization-drill-down>>, Jan. 8, 2018, 9 pages.

Hart, et al., "KPI visuals (Tutorial)", Retrieved From: <<https://powerbi.microsoft.com/en-us/documentation/powerbi-service-tutorial-kpi/>>, Dec. 21, 2017, 5 Pages.

"Sunburst Diagram", Retrieved from: https://datavizcatalogue.com/methods/sunburst_diagram.html, Nov. 20, 2017, 2 Pages.

"International Search Report and Written Opinion Issued in PCT Application No.PCT/US19/023784", dated Jun. 18, 2019, 13 Pages.

* cited by examiner

AGGREGATION AND PROCESSING OF HIERARCHICAL DATA FOR DISPLAY OF INTERACTIVE USER INTERFACE CHART ELEMENTS

BACKGROUND

The use of productivity applications in tracking data points and maintaining datasets for reviews and assessments has become nearly ubiquitous as the ability to store and search for data has become increasingly efficient. However, it can be difficult to quickly ascertain what components were the basis for an arrived upon overall score for a review or assessment, as well as to ascertain what components were the basis for each sub-score for each category that feeds into an overall score for a review or assessment. The problem arises because reviews and assessments generally include a plurality of category types that feed into an overall score, and each category type may include a plurality of data points, which each have an associated score and an associated weight. Charts and graphs do a good job of conveying either the score, or the weight, associated with each data point to users, but they do not typically provide sufficient mechanisms for displaying easily ascertainable summaries of both the score and the weight of each data point in one visual presentation, or for how those scores and weights affect a hierarchical data structure composed of individual data points that feed into categories, and ultimately an overall score for a review or assessment.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for aggregating and processing hierarchical datasets and displaying the result as interactive user interface chart elements of hierarchical charts. Each hierarchical dataset may comprise a plurality of data points, each of the data points having a score and a weight associated with it, and each of the data points being associated with a category type. A weight value may be calculated for each category type based on the combined weight value of each of the data points that feeds into each category type. A score may be calculated for each category type based on a weighted average of each of the data points' scores that feed into a corresponding category type. A plurality of objects representing category types and/or data points of a dataset may be displayed in a hierarchical chart, along with their hierarchical connections. A plurality of the objects may be displayed in a hierarchical format according to size based on the calculated weight value for each category type. An indication of the calculated score for a plurality of the category types and/or a plurality of data points may also be displayed in association with the plurality of objects in the hierarchical chart generated for a dataset.

BRIEF DESCRIPTION OF THE DRAWINGS

Non-limiting and non-exhaustive examples are described with reference to the following figures.

DETAILED DESCRIPTION

Figure 1:
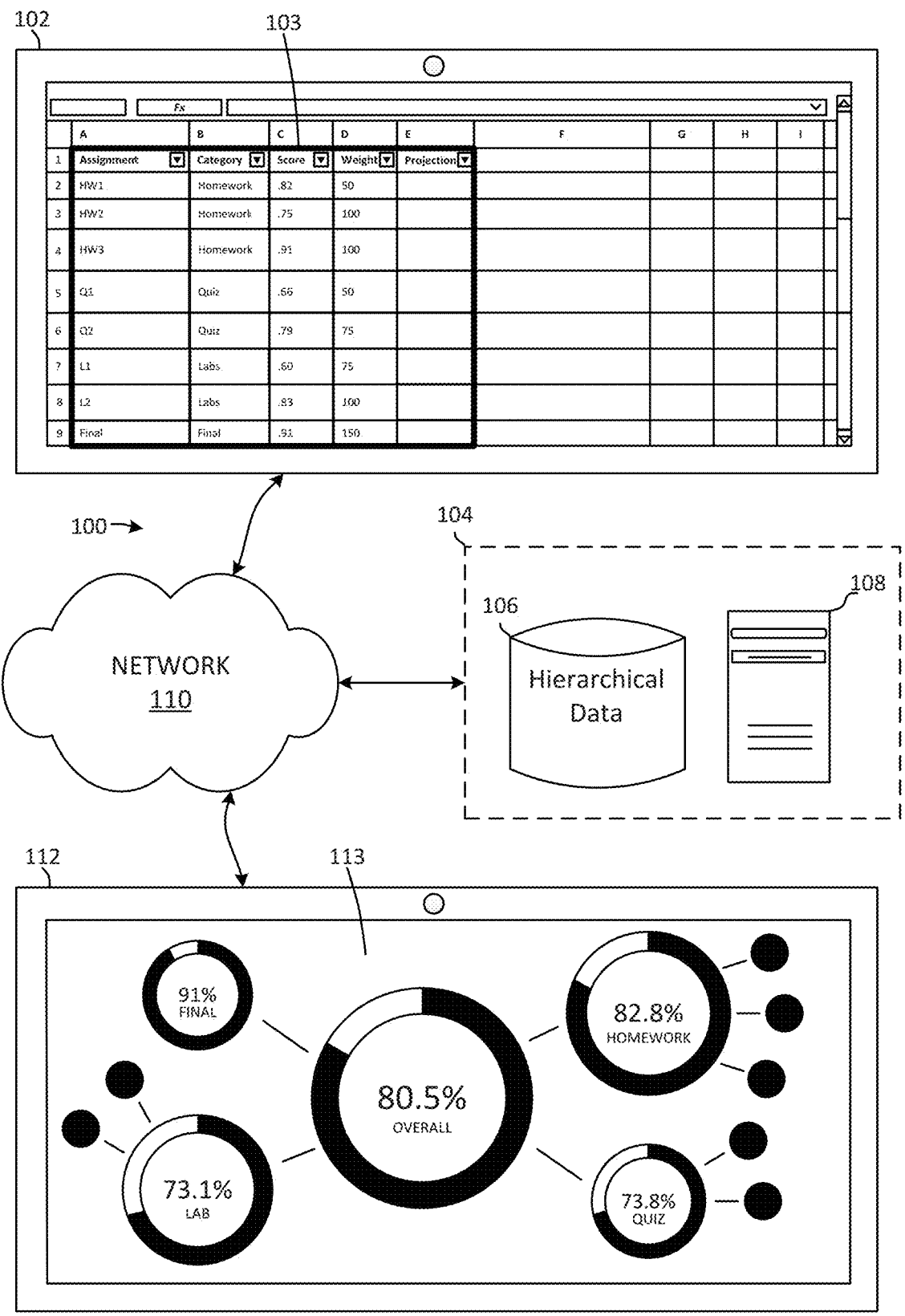
FIG. 1 is a schematic diagram illustrating an example distributed computing environment for aggregating and processing hierarchical data and displaying the result as interactive user interface chart elements.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The various embodiments and examples described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the claims.

Generally, the present disclosure is directed to systems, methods and devices for aggregating and processing hierarchical datasets and displaying the result as interactive user interface chart elements in hierarchical charts. In some examples, a dataset may be stored with an instance of a productivity application (e.g., a spreadsheet application, a word processing application, a presentation application, an email application, a business analytics application, a hierarchical chart application). For example, a table including a plurality of headings and a plurality of values may be included as a dataset in a spreadsheet application. In other examples, a productivity application may retrieve a dataset from a remote service (e.g., a web-based service, a storage service) or a secondary application. The productivity application may be executed entirely on a client computing device, entirely on remote computing devices as a web-based application, or partially on a client computing device and partially on one or more remote computing devices. In some examples, a productivity application service may be maintained on one or more remote computing devices for processing hierarchical datasets into hierarchical charts.

Upon receiving a dataset, the productivity application and/or productivity application service may analyze the dataset and determine whether the dataset is a hierarchical dataset. In determining whether the dataset is a hierarchical dataset, the productivity application and/or productivity service may determine whether the dataset contains a plurality of data points associated with a plurality of categories, and whether each of the plurality of data points is associated with a score and a weight. If the dataset is determined to be a hierarchical dataset based on the analysis, a selectable option may be presented and/or made available via the productivity application to generate a hierarchical chart of the hierarchical dataset. Upon receiving an indication to generate a hierarchical chart from a hierarchical dataset, the productivity application and/or the productivity application may process the hierarchical dataset and cause a hierarchical chart to be displayed.

In generating a hierarchical chart from a hierarchical dataset, the productivity application and/or productivity service may calculate a weighted average score for each category type of the dataset (i.e., the weighted average of the scores from each data point that is fed into a corresponding category). In generating the hierarchical chart, the productivity application and/or productivity service may also calculate an overall score for the dataset. The overall score is the average percent of all the category scores of the dataset, with weight being taken into account. Additionally, prior to generating the hierarchical chart, a determination is made as to weight values associated with each category type of the dataset and each data point of the dataset.

Upon making each of the above-described calculations and determinations for a given dataset, the productivity application and/or productivity service may cause a plurality of interactive user interface objects to be displayed hierarchically with their connections as a hierarchical chart. Each of the plurality of displayed user interface objects correspond either to a category type of the dataset or an overall score for the dataset. Additionally, each of the plurality of displayed objects may be presented in the hierarchical chart in a display size that corresponds to a weight value for the associated category type. For example, if a first category type that feeds into an overall score for a dataset has a weight value of 50, and a second category type that feeds into an overall score for a dataset has a weight value of 100, an interactive object in the hierarchical chart corresponding to the first category type may have a display size that is half the size of an interactive object in the hierarchical chart corresponding to the second category type. In some examples, the display size of each interactive object corresponding to a category type may not reflect a one-to-one relationship with the calculated weights for category type. Thus in the above example, where the first category type has a weight value of 50, and the second category type has a weight value of 100, the interactive object in the hierarchical chart corresponding to the first category type may have a display size that is smaller than the interactive object in the hierarchical chart corresponding to the second category type, but it does not necessarily have to be half the size of the interactive object corresponding to the second category type (e.g., the first object could be ¼, ⅓, ½, etc. the size of the second object). Additionally, each interactive object in the hierarchical chart may be displayed with an indication of a score associated with its category type. Thus, in the above example, and where each of the interactive objects corresponds to a circular object, if the first category type has a calculated weighted average score of 0.30, and the second category type has a calculated weighted average score of 0.75, the object corresponding to the first category type may have a radial score indicator that is filled in for 30% of 360 degrees (i.e., 108 degrees), and the object corresponding to the second category type may have a radial score indicator that is filled in for 75% of 360 degrees (i.e., 270 degrees). In some examples, each interactive category type object in the hierarchical chart may also have its calculated score displayed in a numerical format in physical proximity to it in the hierarchical chart.

In some examples, a hierarchical dataset may comprise projected scores for one or more data points. As such, the productivity application and/or the productivity service may identify each upstream connection and upstream category type (including the overall category type) and in displaying each interactive object in the hierarchical chart containing a projected score, the hierarchical chart may differentiate between objects and connections that are affected by a projected score, and objects and connections that are not affected by a projected score. Various display properties may be utilized in making this differentiation, including the utilization (in interactive objects corresponding to data points, category types, and connections in the hierarchical chart) of: colors, patterns, shadings, fonts, and line size.

According to some aspects, a user may set a target score for a hierarchical dataset. In other examples, the productivity application and/or the productivity service may have a preset target score for hierarchical datasets and/or hierarchical datasets of a certain type. The target score provides a threshold percentage that each data point, category type and/or overall score must meet or exceed for the corresponding interactive objects in the hierarchical chart to be displayably differentiated from interactive objects in the hierarchical chart for each data point, category type and/or overall score that do not meet or exceed the overall score. For example, a user interacting with a hierarchical dataset may set a target score of 75% for that dataset. Any interactive objects in a hierarchical chart generated from the dataset that correspond to a score of less than 75% may thus be displayably differentiated from each interactive object in the hierarchical chart that correspond to a score that meets or exceeds 75%.

FIG. 1 is a schematic diagram illustrating an example distributed computing environment 100 for aggregating and processing a hierarchical dataset 103 and displaying the result as interactive user interface chart elements on a user interface 113 of a computing device 112.

Distributed computing environment 100 comprises computing device 102 and computing device 112, which may be the same or different devices. Distributed computing environment 100 also comprises hierarchical data storage and processing environment 104, which includes hierarchical data storage 106, and server computing device 108. Distributed computing environment 100 also comprises network 110, by which any of the computing devices in distributed computing environment 100 may communicate with one another.

In some examples, the hierarchical dataset 103 may be stored on computing device 102. In other examples, the hierarchical dataset may be stored in remote storage, such as hierarchical data storage 106 in hierarchical data storage and processing environment 104. Similarly, the spreadsheet application displayed on computing device 102 may be executed on computing device 102 or the spreadsheet application may be executed all or in part on one or more remote computing devices, such as server computing device 108 in hierarchical data storage and processing environment 104.

Computing device 102 is executing a spreadsheet application, which includes hierarchical dataset 103. Hierarchical dataset 103 comprises a plurality of data points, each of the data points having a score and a weight associated with it, and each of the data points being a member of a category type (i.e., a homework category type, a quiz category type, a labs category type, a final category type). Each of the data points in hierarchical dataset 103 corresponds to a weighted score for an assignment, each of which is part of a total grade for a class. Hierarchical dataset 103 comprises a column of assignments, under an "assignment" heading in cell A1 of the spreadsheet application; a category column of assignment categories, under a "category" heading in cell B1 of the spreadsheet application; a score column for accrued scores for each assignment, under a "score" heading in cell C1 of the spreadsheet application; a weight column of weights for each assignment, under a "weight" heading in cell D1; and a projection column, in which scores that have not been accrued may be inserted, under a "projection" heading in cell E1.

A first data point corresponding to "HW1" in cell A2 in the spreadsheet application, is a member of a "homework" category, and has an accrued score of 0.82, with a weight of 50. A second data point corresponding to "HW2" in cell A3 in the spreadsheet application, is a member of a "homework" category, and has an accrued score of 0.75, with a weight of 100. A third data point corresponding to "HW3" in cell A4 in the spreadsheet application, is a member of a "homework" category, and has an accrued score of 0.91, with a weight of 100. A fourth data point corresponding to "Q1" in cell A5 in the spreadsheet application, is a member of a "quiz" category, and has an accrued score of 0.66, with a weight of 50. A fifth data point corresponding to "Q2" in cell A6 in the spreadsheet application, is a member of a "quiz" category, and has an accrued score of 0.79, with a weight of 75. A sixth data point corresponding to "L1", in cell A7 in the spreadsheet application, is a member of a "labs" category, and has an accrued score of 0.60, with a weight of 75. A seventh data point corresponding to "L2", in cell A8 in the spreadsheet application, is a member of a "labs" category, and has an accrued score of 0.83, with a weight of 100. An eighth data point corresponding to "Final", in cell A9 in the spreadsheet application, is a member of a "final" category, and has an accrued score of 0.91, with a weight of 150.

One or more computing devices associated with hierarchical dataset 103 (e.g., computing device 102, server computing device 108) may determine that hierarchical dataset 103 is a hierarchical dataset based on the format of the data in the spreadsheet application, the inclusion of a plurality of categories with data points that are scored and weighted in the spreadsheet application, and/or a user command to recognize the values in hierarchical dataset 103 as relating to a hierarchical dataset. For example, one or more computing devices may determine that hierarchical dataset 103 is hierarchical in nature because a plurality of its categories (i.e., "homework", "quiz", and "labs") each have a total categorical score comprised of a plurality of individual data points (i.e., "HW1", "HW2" and "HW3" for "homework", "Q1" and "Q2" for "quiz", and "L1" and "L2" for "labs"), and/or the total score for a class associated with hierarchical dataset 103 is comprised of a plurality of weighted scores for each of the categories represented by hierarchical dataset 103.

A user may initiate processing of hierarchical dataset 103 into interactive user interface chart elements. For example, a user may be provided with a selectable user interface element, which upon its selection, converts hierarchical dataset 103 into interactive user interface chart elements and their hierarchical connections; or a user may provide an audible or typed command to computing device 102 to convert hierarchical dataset 103 into interactive user interface chart elements. Other mechanisms for initiating processing of hierarchical dataset 103 into interactive user interface chart elements are possible as will be readily understandable by those of skill in the art.

One or more computing devices associated with hierarchical data set 103 (e.g., computing device 102, server computing device 108) may process hierarchical dataset 103 into interactive user interface chart elements for display on a user interface of the spreadsheet application, or a different application user interface.

In the illustrated example, computing device 112 displays the result of processing of hierarchical dataset 103 into interactive user interface chart elements and their hierarchical connections, on user interface 113. Each of the designated categories from hierarchical dataset 103, in addition to an "overall" category resulting from the scored and weighted data points of each of the designated categories, correspond to a circular user interface element on the user interface shown on computing device 112. In some examples, the size of each of the displayed circular user interface elements corresponds to each corresponding category's weight in relation to each category's weighted contribution to the overall score for the class. In other examples, only a plurality of the displayed circular user interface elements may be sized according to weight. In some examples, the "overall" hierarchical category user interface element, and each category user interface element that feeds directly into the "overall" hierarchical category score may be sized based on weight (as is the case in shown in the illustrated example in user interface 113). In other examples, the plurality of user interface elements that are sized according to weight may correspond to two or more categories, or two or more data points, of a hierarchical dataset that have been zoomed in on in the graphical user interface (e.g., user interface 113), or that have been otherwise selected in the graphical user interface.

Each of the hierarchical user interface elements that are sized based on weight may have a displayed indication of an accrued or projected score associated with them. For example, each of the categories that have corresponding hierarchical user interface elements in user interface 113, which are sized based on weight (i.e., "overall", "homework", "lab", "final", "quiz"), has percentage of a total possible score that matches an accrued weighted average score for each corresponding category displayed in the center of each hierarchical circular user interface element, in addition to having that percentage indicated by degrees of 360 in an outside ring of each circular user interface element. The indication of the percentage in the outside ring of each user interface element is the percentage of 360 degrees of the circular element that the accrued weighted score makes up for (e.g., 80.5% of 360 degrees is 289.8 degrees).

In the illustrated example, based on the accrued scores for the "homework" category (i.e., score for "HW1", "HW2", and "HW3"), a total weighted average accrued score for that category is 82.8%, which is displayed in the middle of the "homework" user interface element of user interface 113, as well as being indicated in the outside ring of that element. Based on the accrued scores for the "lab" category (i.e., "L1", "L2"), a total weighted average accrued score for that category is 73.1%, which is displayed in the middle of the "labs" user interface element of user interface 113, as well as being indicated in the outside ring of that element. Based on the accrued score for the only data point in the "final" category (i.e., "final"), a total average accrued score for that category is 91%, which is displayed in the middle of the "final" user interface element of user interface 113, as well as being indicated in the outside ring of that element. Based on the accrued scores for the "quiz" category (i.e., "Q1" and "Q2"), a total average accrued score for that category is 73.8%, which is displayed in the middle of the "quiz" user interface element of user interface 113, as well as being indicated in the outside ring of that element. Finally, for the "overall" category, the indicated score reflects the average percent of each of its feeder categories (i.e., "homework", "lab", "quiz", "final"), with their weights being factored into that average. Thus, the percentage for the "overall" category is 80.5%, which is displayed in the middle of the "overall" user interface element of user interface 113, as well as being indicated in the outside ring of that element.

Figure 2:
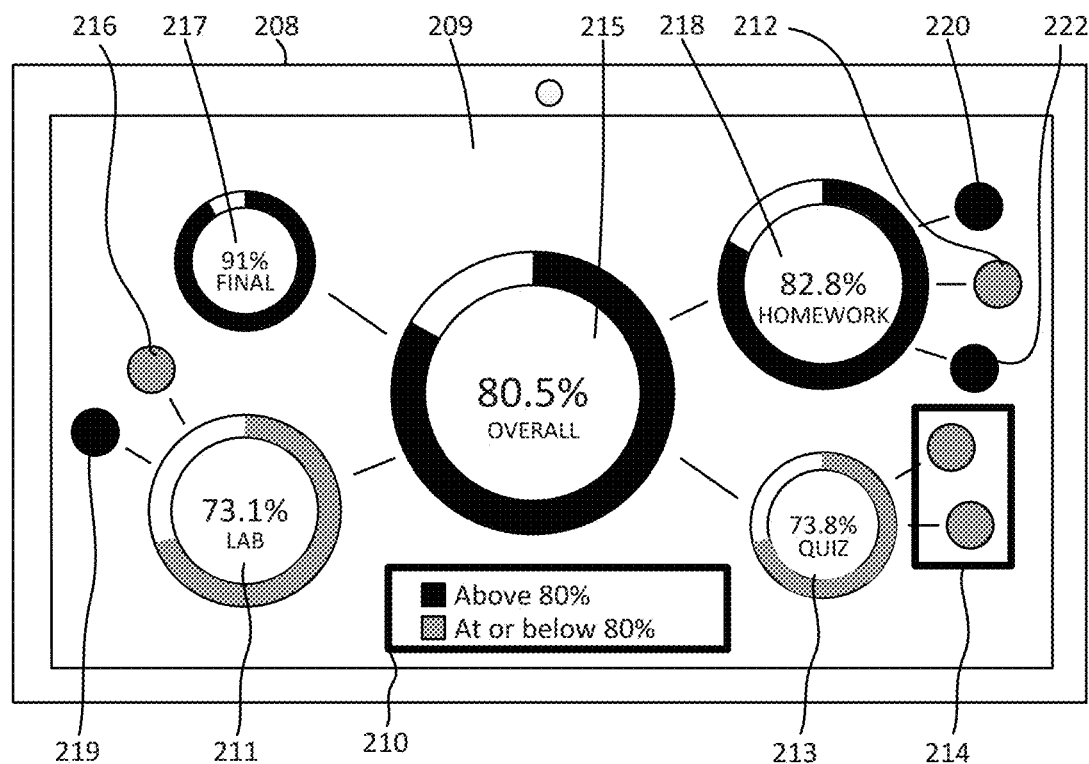
FIG. 2 is a schematic diagram illustrating the conversion of a hierarchical dataset to interactive user interface chart elements in association with a target value.

FIG. 2 is a schematic diagram illustrating the conversion of a hierarchical dataset 202, to interactive user interface chart elements in a user interface 209, in association with a target value. Hierarchical dataset 202 is the same dataset as shown in relation to FIG. 1. However, in FIG. 2, a user, or an application setting, has provided a target value of 80%. The target value provides a threshold percentage for differentiating data points and/or categories, in their display in the hierarchical chart, that have dataset values that are above or below a set target value. In the illustrated example, each of the circular data points and categories for which a determination has been made that a weighted aggregate or projected score falls below 80%, the corresponding hierarchical chart element has either a grey ringed outline corresponding to the element's score percentage (for elements that are sized based on weight in the hierarchical chart—interactive chart element 211 and interactive chart element 213) or is filled in with grey (for elements that are one or more hierarchical levels below the highest "in focus" hierarchical level—interactive chart element 216, interactive chart element 212, and interactive chart elements 214). Alternatively, each of the circular data points and categories for which a determination has been made that a weighted aggregate or projected score is 80% or above, the corresponding hierarchical chart element has either a black ringed outline corresponding to the element's score percentage (for elements that are sized based on weight in the hierarchical cart—interactive chart element 215, interactive chart element 217, and interactive chart element 218) or is filled in with black (for elements that are one or more hierarchical levels below the highest "in focus" hierarchical level—interactive chart element 219, interactive chart element 220, and interactive chart element 222).

Score value 204, for the "HW2" assignment in hierarchical dataset 202, corresponds to interactive chart element 212. Score value 204 has a value of 0.75, which falls below the set target value of 80%. As such, interactive chart element 212 has a grey display type that indicates that it falls below the set target value. Score values 205, for the "Q1" and "Q2" assignments in hierarchical dataset 202, correspond to interactive chart elements 214. The score value for "Q1" has a value of 0.66, and the score value for "Q2" has a value of 0.79, which both fall below the set target value of 80%. As such, interactive chart elements 214 have a grey display type that indicate that those data points fall below the set target value. Score value 206, for the "L1" assignment in hierarchical dataset 202, corresponds to interactive chart element 216. Score value 206 has a value of 0.60, which falls below the set target value of 80%. As such, interactive chart element 216 has a grey display type that indicates that it falls below the set target value.

The weighted average score for the "homework" data points, corresponding to interactive user interface element 218 (i.e., "homework"), is 82.8%, which is above the set target value of 80%. As such, interactive user interface element 218 has a display property (a black outside ring identifying the weighted average score of its data points—the score for homework assignments "HW1", "HW2", and "HW3") in the hierarchical chart that identifies it as meeting or exceeding the set target value. The weighted average score for the "final", which only has one data point, corresponding to interactive user interface element 217 (i.e., "final"), is 91%, which is above the set target value of 80%. As such, interactive user interface element 218 has a display property (a black outside ring identifying the weighted average score of its data points—in this case the score for its one data points for "final"). The weighted average overall score for all the data in hierarchical dataset 202, corresponding to interactive user interface element 215, is 80.5%, which is above the set target value of 80%. As such, interactive user interface element 215 has a display property (a black outside ring identifying the weighted average score of its feeder values) in the hierarchical chart that identifies it as meeting or exceeding the set target value.

The set target value may be displayed in association with the hierarchical chart. For example, the set target value, as well as the display properties that differentiate interactive display elements for which corresponding data is above or below that threshold value, is displayed in user interface 209 by hierarchical chart element 210. It should be understood that display mechanisms other than black or grey color differentiation may be utilized in differentiating data points and/or categories in the hierarchical chart that fall above or below a set target value. For example, a blue color may be used to identify data points and/or categories in the hierarchical chart that are above a set target threshold, and a red color may be used to identify data points and/or categories in the hierarchical chart that are below a set target threshold. Other color differentiations are also possible. Similarly, various shading colors and patterns and/or hatched colors and patterns, and line thicknesses may be utilized in differentiating user interface elements in the hierarchical chart corresponding to data points and/or categories that have values that fall above or below a set target threshold value.

Figure 3:
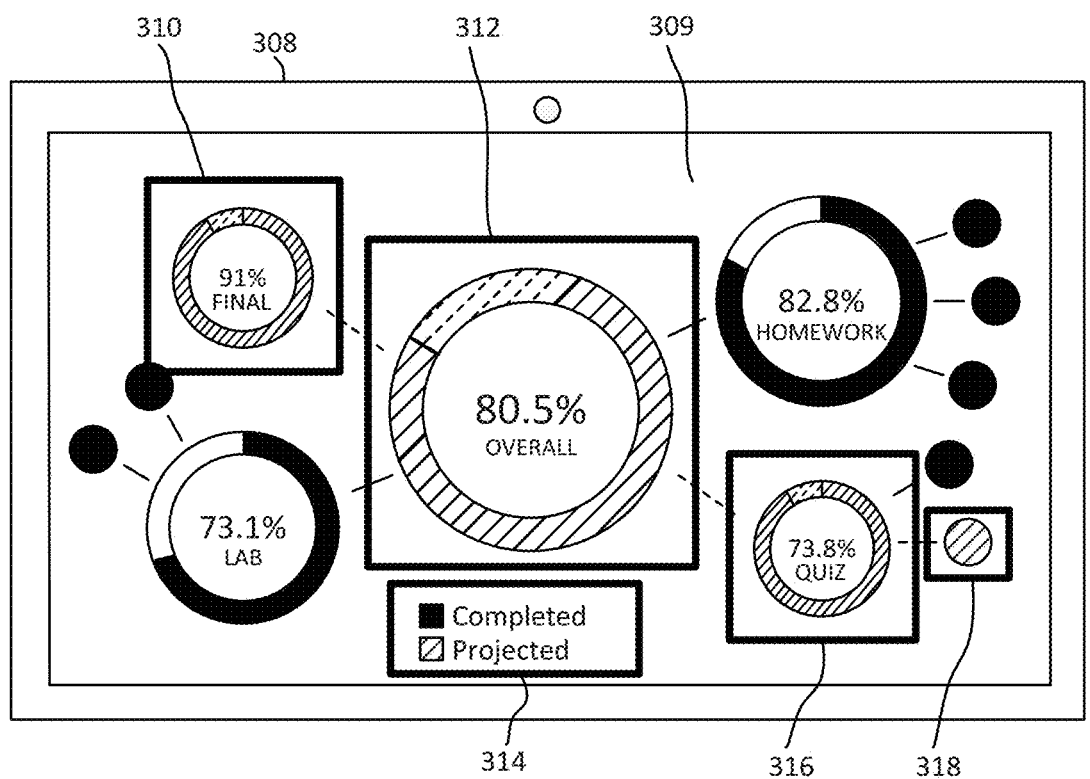
FIG. 3 is another schematic diagram illustrating the conversion of a hierarchical dataset to interactive user interface chart elements in association with accrued and projected values.

FIG. 3 is a schematic diagram illustrating the conversion of a hierarchical dataset 302 to interactive user interface chart elements in association with accrued and projected values. Hierarchical dataset 302 is the same as the hierarchical datasets depicted in FIG. 1 and FIG. 2, except that, in the place of accrued scores for assignment "Q2" and assignment "final", hierarchical dataset 302 has projected scores for those assignments. Specifically, assignment "Q2" has a projected score 304 of 79% (i.e., 0.79), and assignment "final" has a projected score 306 of 91% (i.e., 0.91).

Projected scores may be input by users of hierarchical datasets and/or hierarchical charts. For example, a user that has an incomplete hierarchical dataset that describes her performance on one or more scored and weighted data points and/or categories, may be interested to see a user-friendly chart depicting what her performance is based on projected scores for one or more data points in a dataset for which she has not accrued scores for yet. Such a user, utilizing the systems, methods, and devices described herein, may input a projected score, into a hierarchical dataset, for one or more data points of the hierarchical dataset, and a hierarchical chart may be generated based on those projected scores and/or any accrued scores for data points that may already have been completed/accrued. In other examples, rather than inputting projected scores directly into a hierarchical dataset, a user may zoom in on one or more categories and/or data points in a hierarchical chart that they wish to add a projected score for, and a user may add a projected score and/or modify an existing score to a projected score, via one or more mechanisms in the hierarchical chart user interface/application, and the corresponding projected score may be updated in the underlying hierarchical dataset. In additional examples, if one or more scores of a hierarchical dataset have not accrued, an application and/or service associated with the hierarchical dataset may cause projected scores to be automatically input in the hierarchical dataset for the non-accrued scores. The projected scores that are automatically input into the hierarchical dataset may be calculated based on, for example, an average of the accrued scores for a corresponding category type and/or an average of the accrued scores for all category types.

Upon receiving a dataset that comprises one or more projected values for one or more data points and/or categories, one or more computing devices associated with the underlying dataset (e.g., a computing device running a productivity application that includes the underlying dataset, a computing device running an application that displays interactive hierarchical charts, a server computing device such as server computing device 108 in FIG. 1 that executes one or more operations associated with a productivity application that includes the underlying dataset and/or that executes one or more operations associated with an application that displays interactive hierarchical charts) may cause a hierarchical chart comprising a plurality of interactive user interface elements, sized based on their weight value and including a displayed indication of weighted score averages, to be displayed with their hierarchical connections on user interface 309. The computing device may also cause one or more additional interactive user interface elements corresponding to categories in the hierarchical dataset, or data points in the hierarchical dataset, that feed into (i.e., are lower in the hierarchy of the dataset) to be displayed with their hierarchical connections on user interface 309. However, unlike hierarchical chart elements that correspond to categories and/or data points of a dataset that includes only aggregate scores, each chart element (as well as its displayed upstream hierarchical connections) that is generated in whole or in part based on one or more projected scores in a hierarchical dataset may be differentiated in its display from each chart element (as well as its displayed upstream hierarchical connects) that is generated based on only aggregate scores in a hierarchical dataset.

In the illustrated example, completed vs projected key 314 in the hierarchical chart on user interface 309, indicates display properties for user interface elements (and hierarchical connections) in the hierarchical chart that are based on projected scores, as well as display properties for user interface elements (and hierarchical connections) in the hierarchical chart that are based only on accrued/completed scores. Specifically, completed vs projected key 314 indicates that user interface elements in the hierarchical chart that are based on projected scores have a diagonal line pattern in their score rings, and their upstream hierarchical connections are displayed as dashed lines. Alternatively, completed vs projected key 314 indicates that user interface elements in the hierarchical chart that are based only on accrued/completed scores have filled-in score rings, and their upstream hierarchical connects are displayed as complete un-dashed, full, lines.

It should be understood that, in line with the scope of the current disclosure, alternatives other than the lined vs filled-in score ring display property, are possible for differentiating projected score user interface elements from accrued/completed score user interface elements in the hierarchical chart. For example, different patterns, colors, highlights, filters, and the like may be utilized to displayably differentiate projected score user interface elements from accrued/completed score user interface elements. In some examples, additionally or alternatively to displayably differentiating projected score user interface elements from accrued/completed score user interface elements, a hierarchical chart user interface may display a pop up window and/or a hierarchical chart application may provide an audible cue that indicates that a selected user interface element (e.g., an element hovered over with a cursor, an element clicked on via a mouse, an element interacted with via a touchpad or touch-sensitive display input) is either an accrued user interface element or projected user interface element.

In the illustrated example, the score for data point "Q2" in hierarchical dataset 302 is a projected score 304 of 79% (i.e., 0.79), which has been generated into interactive user interface element 318 of the hierarchical chart displayed on user interface 309. The projected score for data point "Q2" is one of two downstream "quiz" scores that feed into the weighted average that is the basis for generation of interactive user interface element 316. The other downstream quiz score data point that feeds into the weighted average that is the basis for generation of interactive user interface element 316 is the accrued quiz score for "Q1", which is 0.66 (i.e., 66%). Similarly, the weighted average score of "Q1" and "Q2", corresponding to interactive user interface element 316 in the hierarchical chart, is one of four values that feed upstream into the "overall" scored and weighted average for the dataset, which is reflected as interactive user interface element 312 in the hierarchical chart. As such, each user interface element corresponding to a data point and/or category that is based on at least one projected score—in this case data point 318—is caused to be displayed with an indication that it is based on at least one projected score. Thus, user interface element 318 is displayed in a lined cross pattern, the score ring for user interface element 316 is displayed in a lined cross pattern, the score ring for user interface element 312 is displayed in a lined cross pattern, the hierarchical connection between user interface element 318 and user interface element 316 is displayed as a dashed line, and the hierarchical connection between user interface element 316 and user interface element 312 is displayed as a dashed line.

The score for data point "final" in hierarchical dataset 302 is projected score 306 of 91% (i.e., 0.91), which has been generated into interactive user interface element 310 of the hierarchical chart displayed on user interface 309. Because user interface element 310 was generated based on at least one projected score, the score ring for user interface element 310 is displayed in a lined cross pattern, thereby identifying it as a projection, and the hierarchical connection between user interface element 310 and user interface element 312 is displayed as a dashed line, thereby identifying that any depicted chart elements and/or scores displayed upstream from user interface element 310 are based on at least one projected score.

Figure 4:
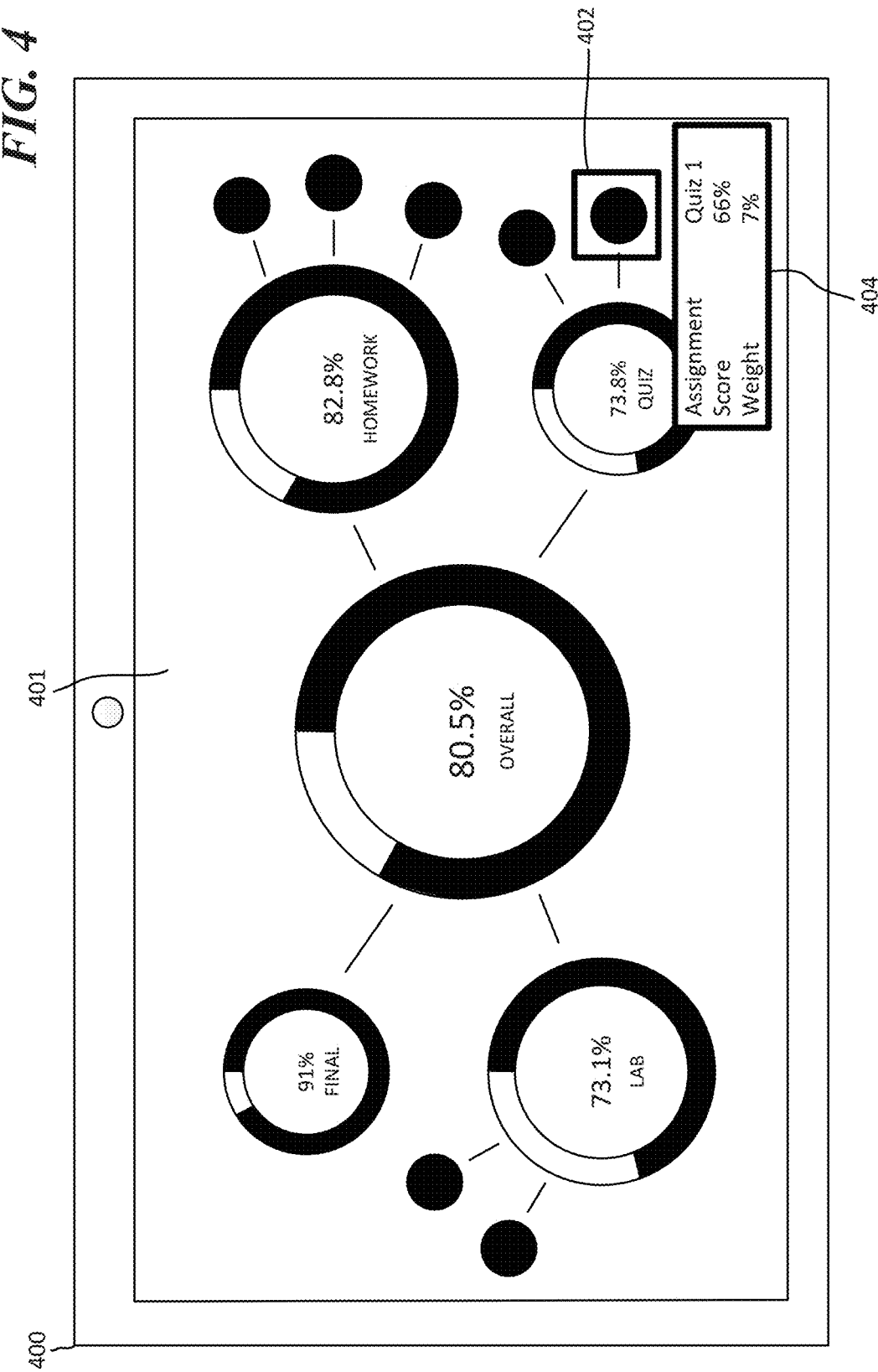
FIG. 4 illustrates an exemplary computing device executing a productivity application with a user interface displaying a plurality of interactive user interface chart elements resulting from processing of a hierarchical dataset.

FIG. 4 illustrates an exemplary computing device 400 executing a productivity application with a user interface 401 displaying a plurality of interactive user interface chart elements resulting from processing of a hierarchical dataset. The user interface also includes pop-up window 404, which is caused to be displayed on user interface 401 in proximity to user interface element 402, when a user interacts with user interface element 402. For example, pop-up window 404 may be caused to be displayed when a user provides a mouse click on user interface element 402, hovers a cursor over user interface element 402, and/or selects user interface element 402 via a touch-sensitive display of computing device 400.

Pop-up window 404 includes summary information related to user interface element 402, which is obtained from the underlying hierarchical dataset which the hierarchical chart that includes user interface element 402 was generated from. In this specific example, the information in pop-up window 404 includes the assignment name for the data point corresponding to user interface element 402 (i.e., "Quiz 1), the accrued or projected score for the data point corresponding to user interface element 402 (i.e., 66%), and the weight of the accrued or projected score for the data point corresponding to user interface element 402 (i.e., 7%).

Interacting with a category type user interface element of the hierarchical chart may cause additional information to be displayed in a pop-up window in a similar manner to pop-up window 404. For example, if a user interacts with the "overall" hierarchical chart element, a pop-up window may be caused to be displayed that includes one or more of: a number of accrued data points and/or categories included in the score for the "overall" chart element, a number of projected data points and/or categories that were fed into the score for the "overall" chart element, the names of one or more data points and/or categories that were fed into the score for the "overall" chart element, as well as other summary information.

Figure 5:
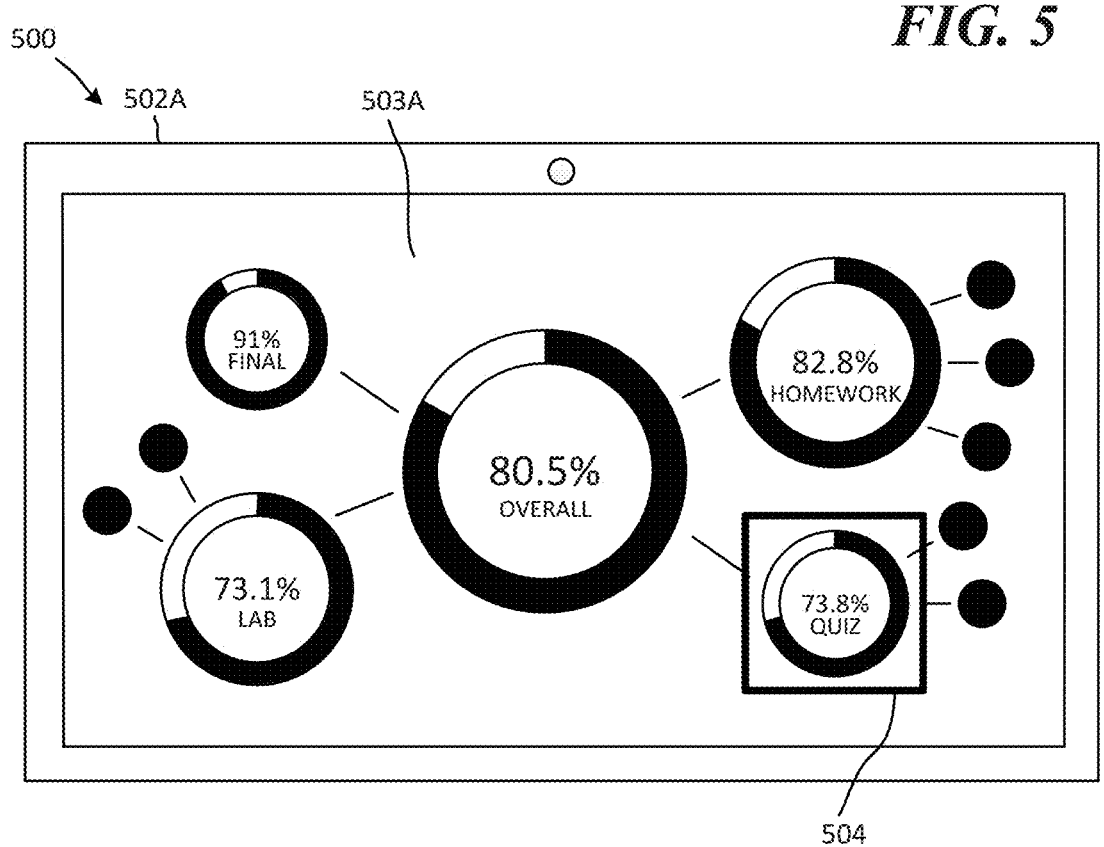
FIG. 5 illustrates the result of a zoom function applied to a section of hierarchical chart in a user interface of a productivity application.
Figure 5:
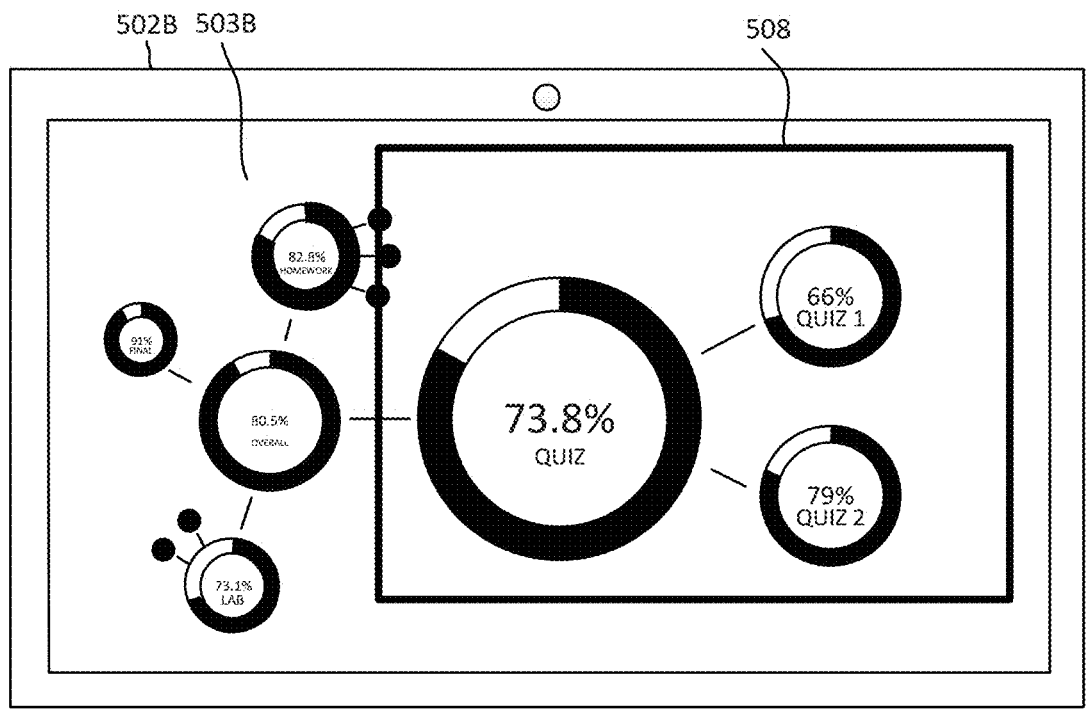

FIG. 5 illustrates the result of a zoom function applied to a section of hierarchical chart in a user interface 503A/503B of a productivity application executed on a computing device 502A/502B. User interface 503A includes a hierarchical chart that includes a plurality of hierarchical user interface elements. In particular, an "overall" hierarchical chart element, and the chart elements corresponding to categories for which scores directly feed into the overall weighted score for the "overall" hierarchical category, are displayed in the hierarchical chart in a size corresponding to their weight, and include a display indication of their corresponding scores. Alternatively, each data point and/or category that is at least two levels down from the "overall" hierarchical category is displayed in the same size and does not include a display indication of its corresponding score.

In the illustrated example, a user as provided an indication to "zoom-in" on interactive hierarchical chart element 504 corresponding to the weighted average value of two quizzes. That feed into hierarchical chart element 504. The indication to "zoom-in" may be received by receiving a mouse click on hierarchical chart element 504, receiving a verbal cue to zoom-in on hierarchical chart element 504, and/or receiving an input on a touch sensitive display of computing device 502A at hierarchical chart element 504. Upon receiving the indication to zoom-in on hierarchical chart element 504, chart element 504, and the data points that feed into chart element 504, are caused to be displayed in a prominent position on user interface 503B. The prominent position and change of position/prominence of these elements is shown in relation to surrounding box 508 on user interface 503B. Additionally, chart element 504 is caused to be displayed with an indication of the weighted average score for the quiz category (i.e., an indication of the weighted average accrued score for quiz 1 and quiz 2), and the two data points that feed into the quiz category are caused to be displayed with an indication of the accrued score for each of those data points (i.e., 66% percent for quiz 1 and 79% for quiz 2). The rest of the displayed hierarchical chart on user interface 503A is also caused to be displayed in a less prominent manner (e.g., less centered display, smaller display, not including as much information about one or more elements) than the interacted with hierarchical chart element and the elements that feed into the interacted with hierarchical chart element (i.e., the elements in surrounding box 508).

Figure 6:
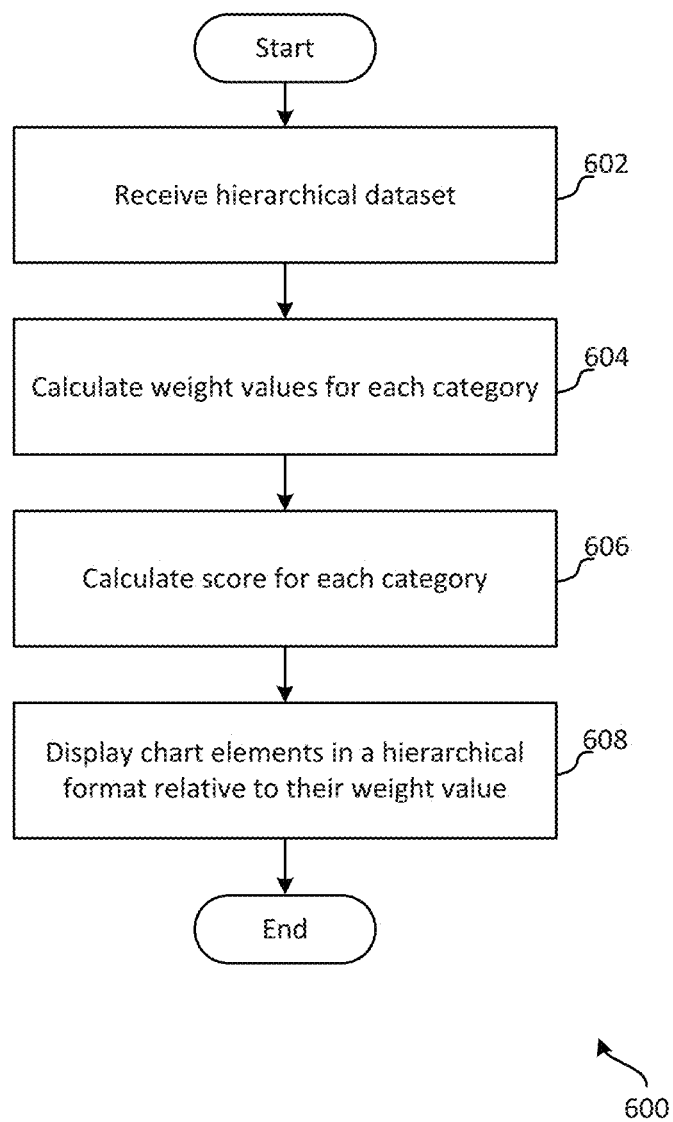
FIG. 6 is an exemplary method for aggregating and processing hierarchical data and displaying the result as interactive user interface chart elements.

FIG. 6 is an exemplary method 600 for aggregating and processing hierarchical data and displaying the result as interactive user interface chart elements. The method 600 begins at a start operation and flow continues to operation 602 where a dataset comprising a plurality of data points is received. Each of data point in the received dataset has a score and a weight associated with it, and each data point in the received dataset is a member of a hierarchical category type of the dataset. The dataset may be stored on a same client computing device as the hierarchical graph will be displayed on, or the dataset may be stored on a remote computing device. In some examples, the dataset may be associated with a productivity application that generates and displays the hierarchical chart. In other examples, the dataset may be associated with a third-party service.

From operation 602 flow continues to operation 604 where a weight value that each hierarchical category type contributes to the hierarchical dataset is calculated. That is, each data point in the hierarchical dataset has a weight associated with it, and the weight value for each data point is calculated by normalizing each data point's weight by the total sum of all of the data points' weights of the hierarchical chart. Weight values are calculated for higher level nodes corresponding to category types (i.e., category types that incorporate scores and weights from a plurality of data points) by adding the sum weight value of each of the data points that feed into each corresponding category type. For example, if an "attendance" category type for an employee evaluation hierarchical dataset has twelve data points (e.g., January through December) with weights of 2% associated with each of those twelve data points, the corresponding weight value for the "attendance" category type is the sum of the weight percentages of each of the twelve data points (i.e., 24%).

From operation 604 flow continues to operation 606 where a score for each of the hierarchical category types is calculated. The score for each category type is a weighted average of each of the values that feed into each corresponding category type. For example, if for employee reviews there is an "attendance" category type, and there are two months that feed into that category type because an employee has only been with the company for two months, the score for the "attendance" category type would be the weighted average of the attendance scores for the two months that feed into the "attendance" category type. Similarly, the score for the "overall" category type is the weighted average percent of the categories that feed into the "overall" category.

From operation 606 flow continues to operation 608 where a plurality of objects that each represent one of the hierarchical category types are displayed, in a hierarchical format relative to the calculated weight values, in association with an indication of a corresponding calculated score. The hierarchical format may be a size format, whereby each of the plurality of objects is displayed in a size corresponding to its calculated weight value (i.e., a higher weight value corresponds to a larger display size). In some examples, the hierarchical format may also relate to displayed connections between displayed objects that correspond to category types, and category types and/or data points represented in the hierarchical graph that feed into those displayed objects. According to some examples, each displayed object may have a display property associated with it that identifies whether the score associated with it is based on one or more projected scores, or whether the score associated is based only on accrued scores. In additional examples, each displayed connection that is upstream from a category type object or data point object in the hierarchical chart may have a display property associated with it that identifies whether one or more downstream objects is based on one or more projected scores. In still additional examples, a user may set a target score for a dataset, and each object corresponding to a data point, a category type and/or an overall score, may have a display property associated with it identifying whether the calculated score for that object meets the target score value, or is below the target score value.

From operation 608 flow continues to an end operation, and the method 600 ends.

Figure 7:
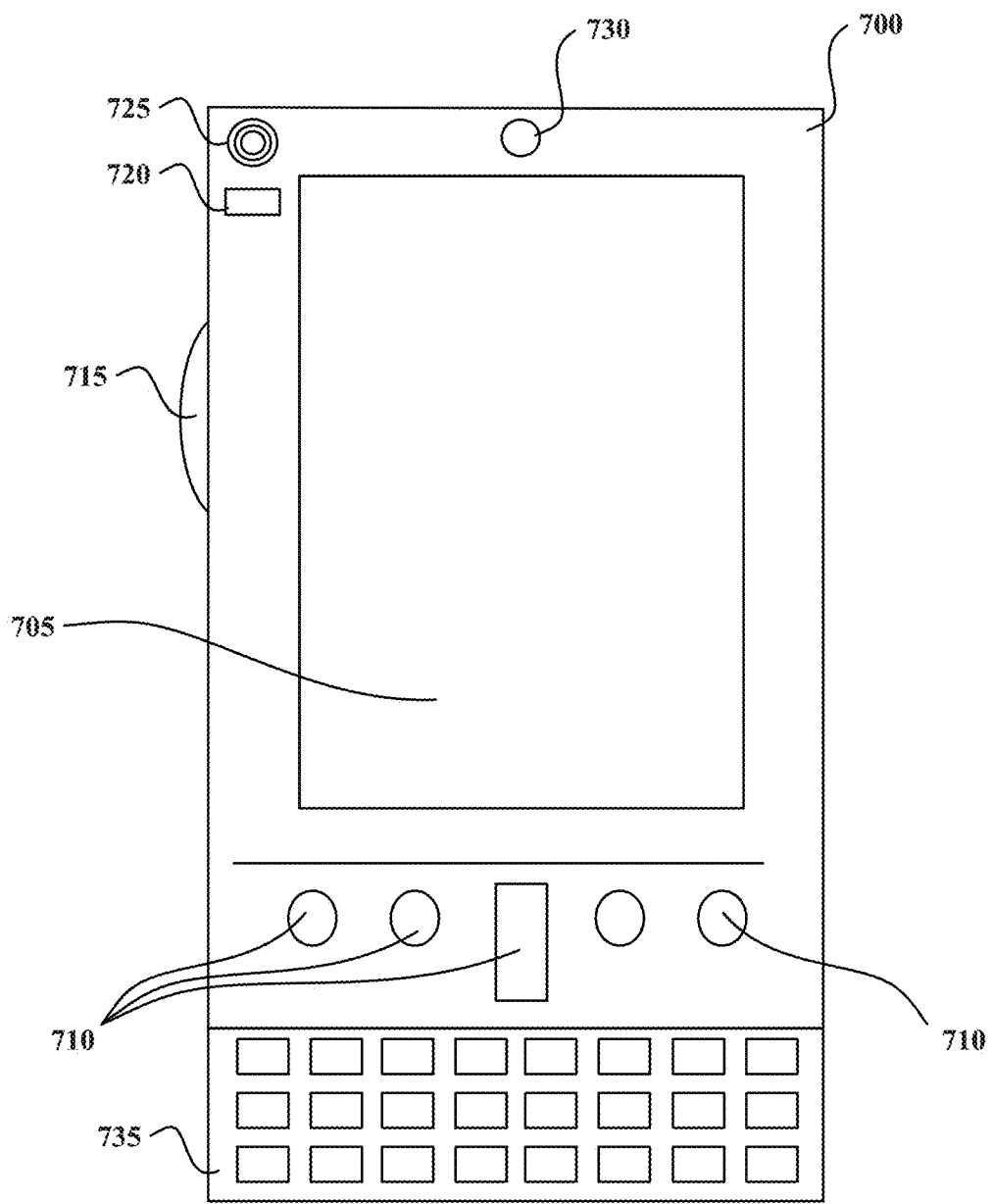
FIGS. 7 and 8 are simplified diagrams of a mobile computing device with which aspects of the disclosure may be practiced.
Figure 8:
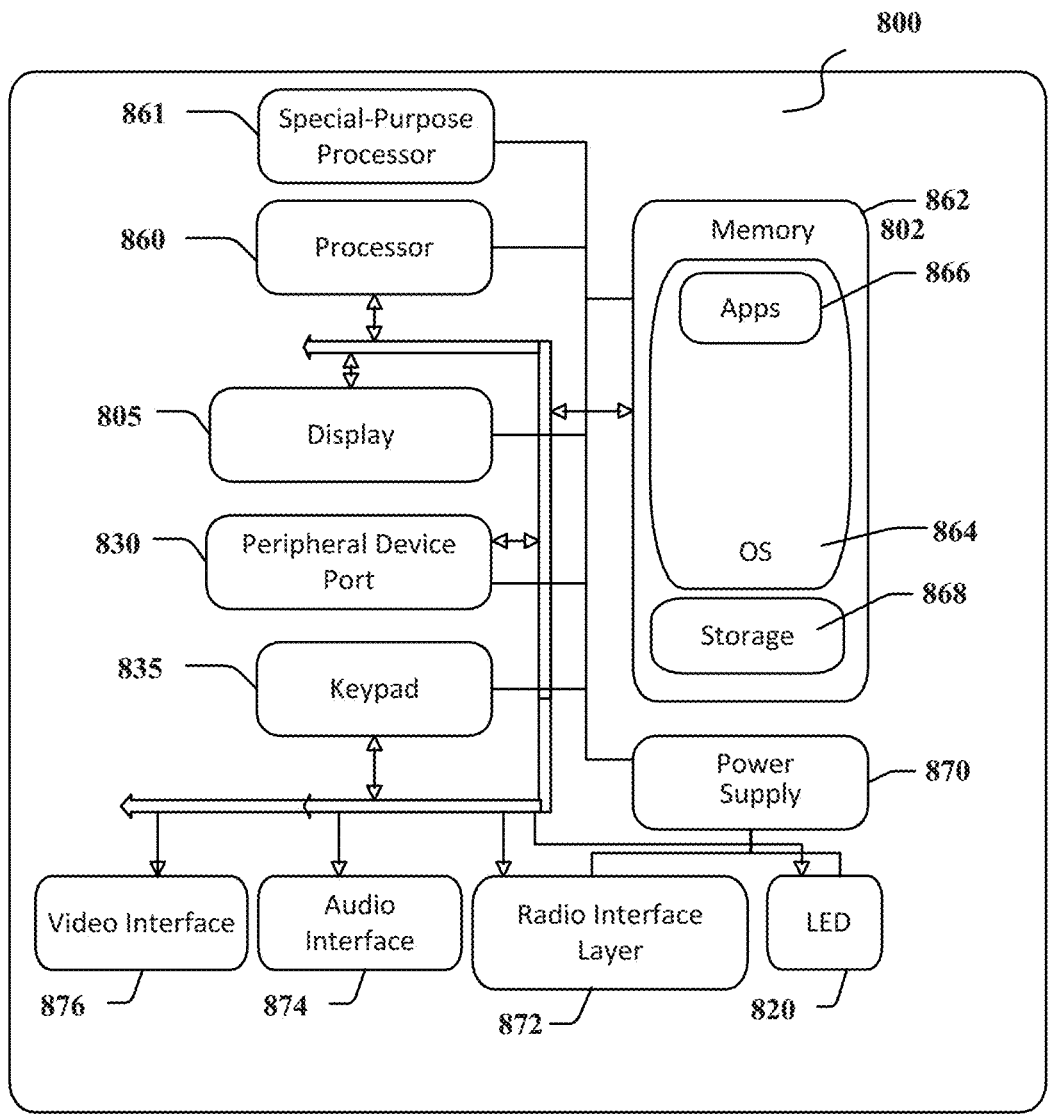

FIGS. 7 and 8 are simplified diagrams of a mobile computing device with which aspects of the disclosure may be practiced.

FIGS. 7 and 8 illustrate a mobile computing device 700, for example, a mobile telephone, a smart phone, wearable computer, a tablet computer, an e-reader, a laptop computer, and an augmented reality computer, with which embodiments of the disclosure may be practiced. With reference to FIG. 7, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative aspects, mobile computing device 700 may incorporate more or fewer input elements. For example, the display 705 may not be a touch screen in some embodiments. In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display. In various embodiments, the output elements include the display 705 for showing a graphical user interface (GUI), a visual indicator 620 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 8 is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including instructions for identifying a target value in a data set.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 720 may be used to provide visual notifications, and/or an audio interface 874 may be used for producing audible notifications via the audio transducer 725. In the illustrated embodiment, the visual indicator 720 is a light emitting diode (LED) and the audio transducer 725 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 725, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of an on-board camera 730 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8 by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

Figure 9:
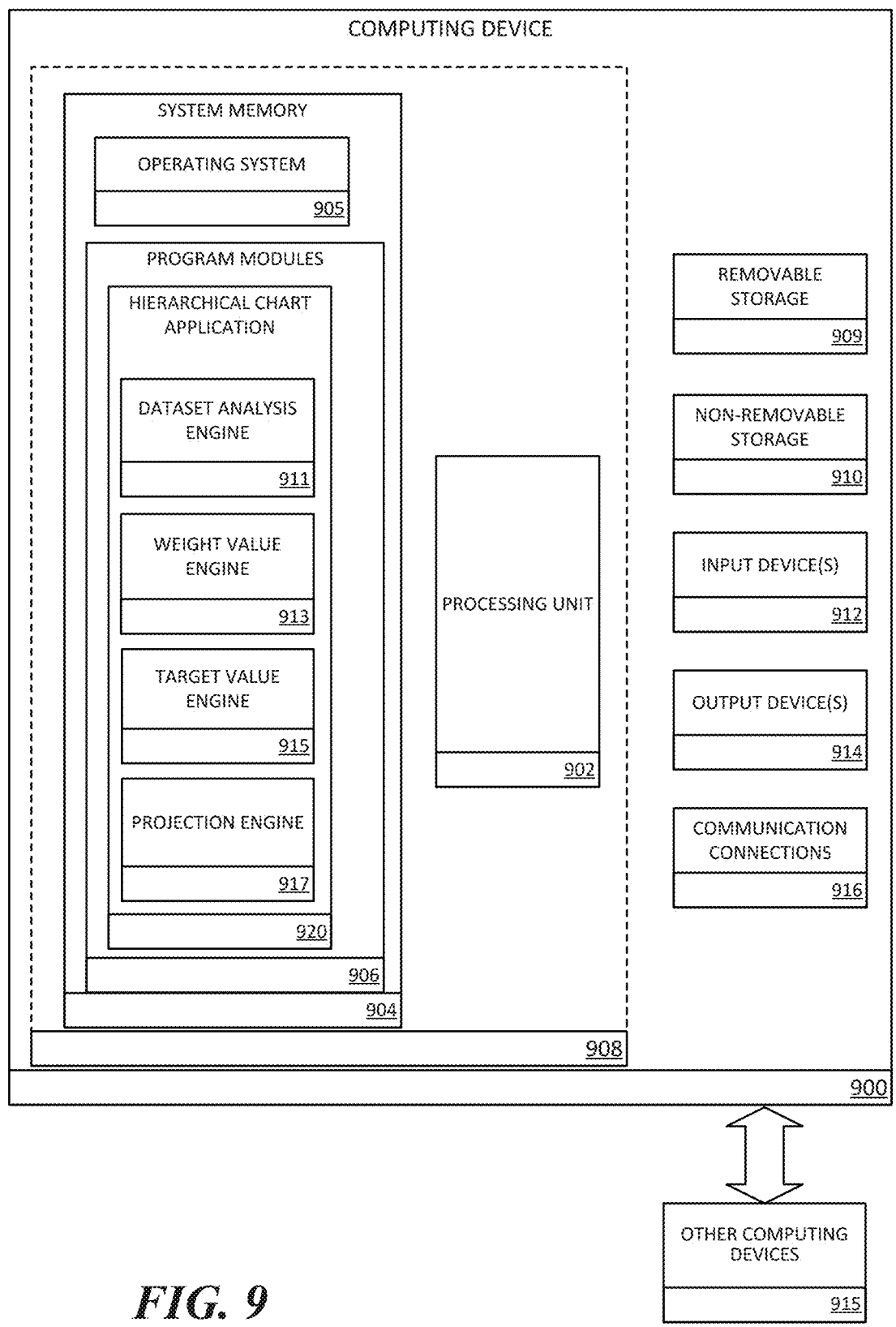
FIG. 9 is a block diagram illustrating example physical components of a computing device with which aspects of the disclosure may be practiced.

FIG. 9 is a block diagram illustrating physical components (e.g., hardware) of a computing device 900 with which aspects of the disclosure may be practiced. The computing device components described below may have computer executable instructions for assisting with interacting with and processing hierarchical datasets. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories. The system memory 904 may include an operating system 905 suitable for running one or more productivity application programs. The operating system 905, for example, may be suitable for controlling the operation of the computing device 900. Furthermore, embodiments of the disclosure may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 (e.g., hierarchical chart application 920) may perform processes including, but not limited to, the aspects, as described herein. According to examples, the dataset analysis engine 911 may perform one or more operations associated with determining whether a dataset is a hierarchical dataset. The weight value engine 913 may perform one or more operations associated with calculating a relative weight value associated with each of a plurality of data points and/or category types for a hierarchical dataset, and causing a plurality of interactive objects corresponding to the data points and/or category types to be displayed in a size according to their corresponding relative weight values. The target value engine 915 may perform one or more operations associated with differentiating displayed objects in a hierarchical chart that meet or exceed a target value from objects in a hierarchical chart that are below a target value. The projection engine 917 may perform one or more operations associated with differentiating displayed objects in a hierarchical chart that rely on a projected score from objects in a hierarchical chart that only rely on aggregate scores.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 900 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 900 may also have one or more input device(s) 912 such as a keyboard, a mouse, a pen, a sound or voice input device, a touch or swipe input device, etc. The output device(s) 914 such as a display, speakers, a printer, etc. may also be included. The aforementioned devices are examples and others may be used. The computing device 900 may include one or more communication connections 916 allowing communications with other computing devices 915. Examples of suitable communication connections 916 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 10:
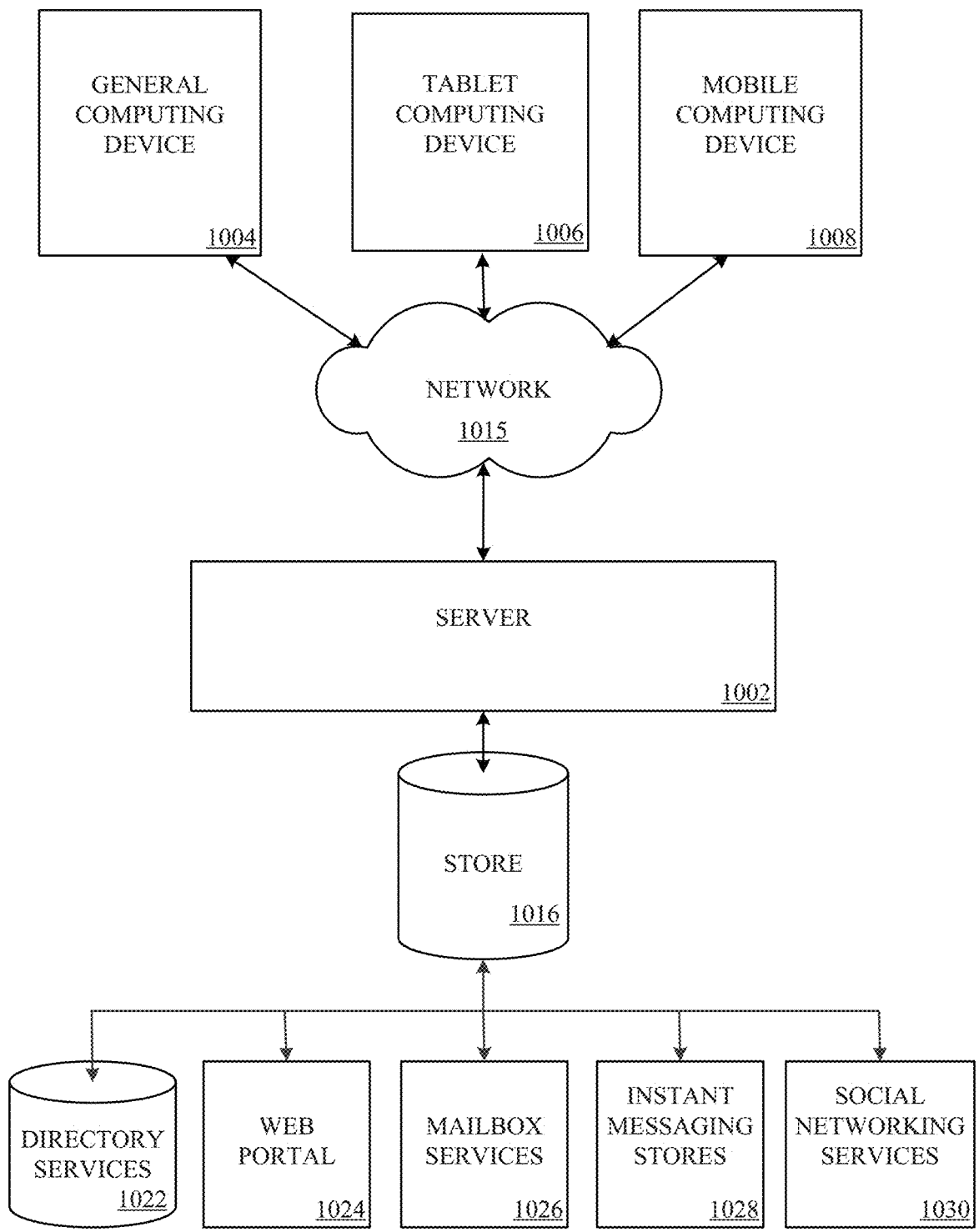
FIG. 10 is a simplified block diagram of a distributed computing system in which aspects of the present disclosure may be practiced.

FIG. 10 illustrates one aspect of the architecture of a system for processing data received at a computing system from a remote source, such as a personal/general computer 1004, tablet computing device 1006, or mobile computing device 1008, as described above. Content displayed at server device 1002 may be stored in different communication channels or other storage types. For example, various documents may be stored using a directory service 1022, a web portal 1024, a mailbox service 1026, an instant messaging store 1028, or a social networking site 1030. The program modules 1006 may be employed by a client that communicates with server device 1002, and/or the program modules 1006 may be employed by server device 1002. The server device 1002 may provide data to and from a client computing device such as a personal/general computer 1004, a tablet computing device 1006 and/or a mobile computing device 1008 (e.g., a smart phone) through a network 1015. By way of example, the computer system described above with respect to FIGS. 7-9 may be embodied in a personal/general computer 1004, a tablet computing device 1006 and/or a mobile computing device 1008 (e.g., a smart phone). Any of these embodiments of the computing devices may obtain content from the store 1016, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The systems, methods, and devices described herein provide technical advantages for improving the discernibility of useful information in hierarchical datasets that include a plurality of data points corresponding to category types, where each of the data points is associated with a score and a weight. The current disclosure presents unique mechanisms for generating and displaying a single chart from hierarchical datasets to quickly and efficiently view weight and score information associated with each data point and each category type, as well as how those elements each contribute to an overall score for the dataset. The hierarchical charts described herein allow users to quickly ascertain what data points, categories, and associated scores of a hierarchical dataset provide the most impact on an overall score for a review or assessment of an item (e.g., a class grade, an employment review, a travel review, a product review, a business review, an aptitude assessment), as well as to efficiently determine what areas/categories/data points should be focused on to improve the overall score for the assessment or review. Unlike previous solutions for charting hierarchical datasets with data points that include a score and a weight, which would typically require the generation of two graphs (one for score and one for weight), the hierarchical charts described herein provide easily discernable information about the weight and score for data points and categories in a single chart. This saves on processing costs (i.e., CPU cycles), by only requiring that a single chart be generated for a dataset, rather than multiple charts, as was typically previously required. Storage costs associated with saving multiple charts for a hierarchical dataset are also minimized by only requiring the storage of one chart for each hierarchical dataset.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for displaying interactive charts, the computer-implemented method comprising:
    receiving a dataset comprising a plurality of data points, wherein the dataset has an overall score, and wherein each of the plurality of data points:
        is a member of a hierarchical category type of the dataset;
        has a score comprising a first percentage of a total possible score for a corresponding data point, wherein each score for each of the plurality of data points contributes to the overall score for the dataset; and has a weight comprising a second percentage for a combined weight score for the overall score for the dataset;

for each hierarchical category type, calculating a category weight value that each hierarchical category type contributes to the dataset, relative to each other category type;

for each hierarchical category type, calculating a category score;

causing, in a hierarchical size format relative to the calculated category weight values, a plurality of graphical objects to be displayed that each represent one of the hierarchical category types; and causing an indication of the calculated category score for a plurality of the hierarchical category types to be displayed as part of a plurality of corresponding displayed graphical objects.

2. The computer-implemented method of claim 1, wherein the plurality of graphical objects are circular objects.

3. The computer-implemented method of claim 1, further comprising:

determining a hierarchical zoom level of the displayed graphical objects in a productivity application user interface, wherein the hierarchical zoom level comprises:
  a primary category type of the plurality of hierarchical category types having a most prominent display position in the productivity application user interface,
  a secondary category type of the plurality of hierarchical category types having a second most prominent display position in the productivity application user interface, and
  one or more tertiary category types of the plurality of hierarchical category types having less prominent display positions in the productivity application user interface than the primary category type and the second category type.

4. The computer-implemented method of claim 3, wherein the indication of the calculated category score is only displayed in association with objects corresponding to the primary and secondary category types of the plurality of hierarchical category types.

5. The computer-implemented method of claim 1 wherein one or more of the hierarchical category types are projection categories comprising a plurality of data points with accrued scores and a plurality of data points with projected scores, and wherein one or more of the hierarchical category types are accrued categories with accrued scores for each of their data points.

6. The computer-implemented method of claim 5, wherein at least one display property of a displayed projection category object indicates that the displayed projection category object reflects projected scores, and wherein at least one display property of a displayed accrued category object indicates that the displayed accrued category object reflects accrued scores.

7. The computer-implemented method of claim 1, wherein at least one of the hierarchical category types does not have an input score for at least one of its data points, and wherein the method further comprises:

receiving a target value for the overall score; and displaying, via a display property of each of the displayed graphical objects, an indication of whether each corresponding hierarchical category type is above or below the received target value based on input scores for each corresponding hierarchical category type.

8. A system for displaying interactive charts from hierarchical datasets, the system comprising:

a memory for storing executable program code; and one or more processors, functionally coupled to the memory, the one or more processors being responsive to computer-executable instructions contained in the program code and operative to:

receive a dataset comprising a plurality of data points, wherein the dataset has an overall score, and wherein each of the plurality of data points:
  is a member of a hierarchical category type of the dataset;
  has a score comprising a first percentage of a total possible score for a corresponding data point, wherein each score for each of the plurality of data points contributes to the overall score for the dataset; and
  has a weight comprising a second percentage for a combined weight score for the overall score for the dataset;

for each hierarchical category type, calculate a category weight value that each hierarchical category type contributes to the dataset, relative to each other category type;

for each hierarchical category type, calculate a category score;

cause, in a hierarchical size format relative to the calculated category weight values, a plurality of graphical objects to be displayed that each represent one of the hierarchical category types; and cause an indication of the calculated category score for a plurality of the hierarchical category types to be displayed as part of a plurality of corresponding displayed graphical objects.

9. The system of claim 8, wherein the plurality of graphical objects are circular objects.

10. The system of claim 8, wherein the one or more processors are further responsive to the computer-executable instructions contained in the program code and operative to:

determine a hierarchical zoom level of the displayed graphical objects in a productivity application user interface, wherein the hierarchical zoom level comprises:
  a primary category type of the plurality of hierarchical category types having a most prominent display position in the productivity application user interface;
  a secondary category type of the plurality of hierarchical category types having a second most prominent display position in the productivity application user interface, and
  one or more tertiary category types of the plurality of hierarchical category types having less prominent display positions in the productivity application user interface than the primary category type and the second category type.

11. The system of claim 10, wherein the indication of the calculated category score is only displayed in association with objects corresponding to the primary and secondary category types of the plurality of hierarchical category types.

12. The system of claim 11, wherein:

each displayed graphical object corresponding to the primary category type has a display size that is larger than each displayed graphical object corresponding to the second category type and each displayed graphical object corresponding to the one or more tertiary category types;

each displayed graphical object corresponding to the secondary category type has a display size that is larger than each displayed graphical object corresponding to each displayed graphical object corresponding to the one or more tertiary category types; and each displayed graphical object corresponding to the one or more tertiary category types has a same display size.

13. The system of claim 8, wherein one or more of the hierarchical category types are projection categories comprising a plurality of data points with accrued scores and a plurality of data points with projected scores, and wherein one or more of the hierarchical category types are accrued categories with accrued scores for each of their data points.

14. The system of claim 13, wherein at least one display property of a displayed projection category object indicates that the displayed projection category object reflects projected scores, and wherein at least one display property of a displayed accrued category object indicates that the displayed accrued category object reflects accrued scores.

15. The system of claim 8, wherein at least one of the hierarchical category types does not have an input score for at least one of its data points, and wherein the one or more processors are further responsive to the computer-executable instructions contained in the program code and operative to:

receive a target value for the overall score; and display, via a display property of each of the displayed graphical objects, an indication of whether each corresponding hierarchical category type is above or below the received target value based on input scores for each corresponding hierarchical category type.

16. A computer-readable storage media comprising executable instructions that, when executed by a processor, assists with displaying interactive charts, the computer-readable storage media including instructions executable by the processor for:

receiving a dataset having an overall score, the dataset comprising:

a first data point that:

is a member of a first hierarchical category type of the dataset;

has a first score comprising a first percentage of a total possible score for the first data point, wherein the first score contributes to the overall score for the dataset; and has a first weight comprising a second percentage for a combined weight score for the overall score for the dataset;

a second data point that:

is a member of a second hierarchical category type of the dataset;

has a second score comprising a third percentage of a total possible score for the second data point; and has a second weight comprising a fourth percentage for the combined weight score for the overall score for the dataset;

causing, in a hierarchical size format relative to the first weight and the second weight:

a first graphical display element corresponding to the first data point to be displayed, wherein the first graphical display element comprises an indication of the first percentage of the total possible score for the first datapoint; and a second graphical display element corresponding to the second data point to be displayed, wherein the second graphical display element comprises an indication of the third percentage of the total possible score for the second datapoint.

17. The computer-readable storage media of claim 16, wherein the first graphical display element is a circular object and the second graphical display element is a circular object.

18. The computer-readable storage media of claim 16, wherein:

the first score is a projected score, and the first graphical display element is caused to be displayed in a first format; and the second score is an accrued score, and the second graphical display element is caused to be displayed in a second format.

* * * * *